Oct. 19, 1926.
F. C. OWEN
1,604,069
HOLDER FOR ARC WELDING ELECTRODES
Filed Jan. 27, 1925
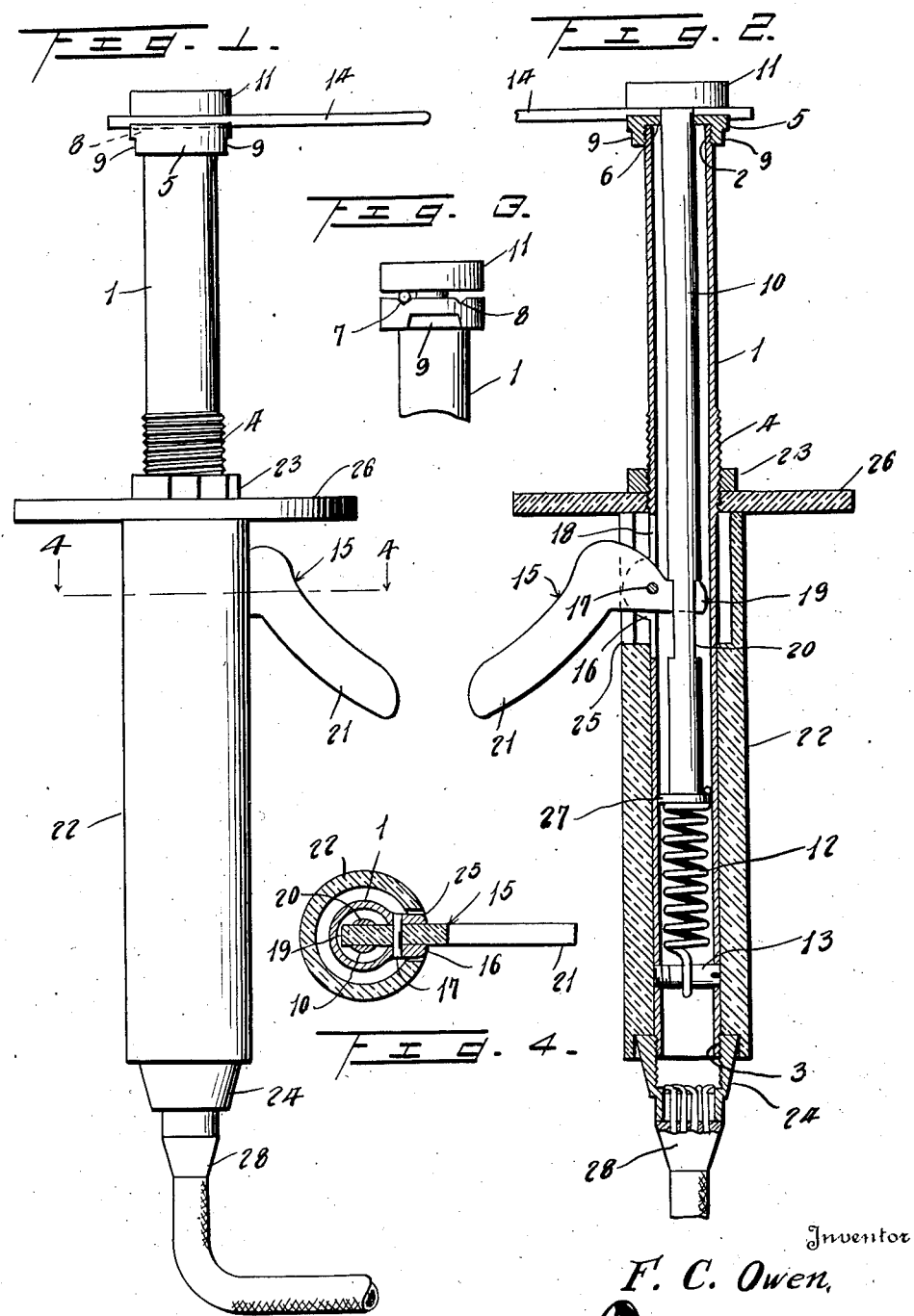
Inventor
F. C. Owen,
By
Attorney Patented Oct. 19, 1926.

1,604,069

UNITED STATES PATENT OFFICE.

FREDERICK C. OWEN, OF FAYETTEVILLE, NORTH CAROLINA.

HOLDER FOR ARC-WELDING ELECTRODES.

Application filed January 27, 1925. Serial No. 5,099.

This invention relates to electric arc welding apparatus, and more particularly to the electrode holders of such apparatus.

The invention has for one of its objects to improve and simplify the general construction of holders of the character stated and to provide one which shall include novel and simple means through the medium of which a metallic or graphite electrode may be easily and quickly secured to or removed from the holder.

With the above and other objects in view, the invention consists of the construction, combination and arrangement of parts hereinafter fully described and claimed, and illustrated in the accompanying drawing, wherein:

Figure 1 is a view in side elevation of the electrode holder,

Figure 2 is a sectional view taken on a plane extending longitudinally and centrally through the electrode holder, Figure 3 is a detail view of the forward or clamping end of the electrode holder, and Figure 4 is a detail sectional view taken on the plane indicated by the line 4—4 of Figure 1.

The electrode holder comprises a metallic tube 1 which is provided at its forward end with external screw threads 2, at its rearward end with external screw threads 3, and at a point intermediate its ends with external screw threads 4. A cap 5 is secured to the forward end of the tube 1 by means of the screw threads 2. The cap 5 is provided with an opening 6 in axial alinement with the tube 1, and it is provided in its forward side with grooves 7 and 8 arranged on opposite sides of the opening 6. To permit it to be applied to or removed from the tube 1 by means of a wrench, the cap 5 is provided in its lateral sides with oppositely arranged flat portions 9. A rod 10 which is slidably mounted in the tube 1 and opening 6 of the cap 5, is provided at its forward end with a head 11 positioned at the forward side of the cap 5. The cap 5 constitutes the relatively stationary jaw and the head 11 the relatively movable jaw of a clamp which is adapted to secure the electrode to the holder, the electrode being inserted between these parts in one of the grooves 7—8. A coil spring 12 which is secured at its forward end to the rearward end of the rod 10 and which is secured at its rearward end to a screw 13 carried by the tube 1, is adapted to yieldingly urge the head 11 in the direction of the cap 5 under sufficient pressure to prevent any casual movement of the electrode with respect to the holder. The electrode is designated 14 and it may be made of metal or graphite. An elbow lever 15 provides means by which the head 11 may be moved forwardly with respect to the cap 5 against the tension of the spring 12 when it is desired to place a new electrode in the holder. The lever 15 is pivoted to and between a pair of ears 16 by means of a pin 17. The ears 16 are arranged on opposite sides of a longitudinally extending slot 18 in the tube 1. The slot 18 is located rearwardly of the threads 4 of the tube 1, and the arm 19 of the lever 15 extends through the slot into the tube 1, the inner end of this arm working in a slot 20 formed in and extending longitudinally of the rod 10. The arm 21 overlies the hand grip 22 of the holder. The hand grip 22 and the lever 15 are made of any suitable non-conducting material or materials, and the former is secured upon the rear portion of the tube 1 by a nut 23 mounted on the threaded portion 4 of the tube and a nut 24 mounted on the threaded end 3 of the tube. The tube 1 is provided with a slot 25 for the reception of the lever 15. A hand shield 26 is secured upon the tube 1 between the hand grip 22 and nut 23. The rearward end of the rod 10 is provided with a flange 27 which, together with the wall of the opening 6 in the head 5, prevents the rod from having any lateral movement with respect to the tube 1. A lead or conductor 28 is carried by the nut 24, and the latter establishes an electrical connection between the lead and the conducting portions of the holder.

From the foregoing description, taken in connection with the accompanying drawing, it should be apparent that the lever 15 may be actuated by the thumb of the hand in which the grip 22 is held. When it is desired to place an electrode in the holder, an inwardly directed pressure is applied to the arm 21 of the lever 15, with the result that the head 11 is moved forwardly with respect to the cap 5 a sufficient distance to permit an electrode to be inserted between these parts in one of the grooves 7—8. After the application of the electrode, the lever 15 is released whereupon the spring 12 moves the head 11 in the direction of the cap 5 with the result that the electrode is clamped between these parts under sufficient pressure to prevent the electrode from having any lateral or endwise movement with respect to the holder.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:

A holder for arc welding electrodes, comprising a tube having a threaded rearward end and provided between its ends with an externally threaded portion, a nut engaged with the threaded portion of the tube, a hand shield mounted on the tube and contacting with the rearward side of the nut, a lead carrying member engaged with the threaded end of the tube, a handle mounted on the tube between the member and shield, said member and shield securing the handle to the tube, a jaw carried by the forward end of the tube and provided in its forward side with grooves, a rod slidably passing through the jaw into the tube and provided in its inner end portion with a longitudinally extending slot, a second jaw carried by the forward end of the rod forwardly beyond the first jaw, a screw secured to and extending across the tube, a spring secured to the tube and the inner end of the rod, the tube being provided rearwardly beyond the shield with a longitudinally extending slot and the handle having a registering slot, and a lever extending through the slots of the tube, handle and rod and pivoted to the tube.

In testimony whereof I affix my signature.

FREDERICK C. OWEN.